US012673580B2

(12) United States Patent
Xiong et al.

(10) Patent No.: US 12,673,580 B2
(45) Date of Patent: Jul. 7, 2026

(54) BATTERY CIRCUIT AND VEHICLE

(71) Applicant: BYD Company Ltd., Shenzhen (CN)

(72) Inventors: Shi Xiong, Shenzhen (CN); Tianyu Feng, Shenzhen (CN); Linwang Deng, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 0 days.

(21) Appl. No.: 18/941,097

(22) Filed: Nov. 8, 2024

(65) Prior Publication Data

US 2025/0065774 A1     Feb. 27, 2025

Related U.S. Application Data

(63) Continuation of application No. PCT/CN2023/079720, filed on Mar. 6, 2023.

(30) Foreign Application Priority Data

May 31, 2022     (CN) .......................... 202210611784.6

(51) Int. Cl.
*B60L 58/18*          (2019.01)
*B60L 50/60*          (2019.01)
(Continued)

(52) U.S. Cl.
CPC .............. *B60L 58/18* (2019.02); *B60L 50/60* (2019.02); *B60L 58/24* (2019.02); *H02J 7/342* (2020.01); *H02J 7/977* (2026.01)

(58) Field of Classification Search
None
See application file for complete search history.

(56) References Cited

U.S. PATENT DOCUMENTS

| | | | |
|---|---|---|---|
| 2008/0143281 A1 | 6/2008 | Yaguchi | |
| 2015/0222137 A1* | 8/2015 | Wang | ................... H02J 7/0019 |
| | | | 320/103 |

(Continued)

FOREIGN PATENT DOCUMENTS

| | | |
|---|---|---|
| CN | 102074761 A | 5/2011 |
| CN | 107204654 A | 9/2017 |

(Continued)

OTHER PUBLICATIONS

Jul. 12, 2024—(CN) 1st Office Action—App. No. 202210611784.6 w/ machine translation.

(Continued)

*Primary Examiner* — Menatoallah Youssef
*Assistant Examiner* — Joel Barnett
(74) *Attorney, Agent, or Firm* — Banner & Witcoff, Ltd.

(57) ABSTRACT

A battery circuit and a vehicle are disclosed. The battery circuit comprises a power supply terminal, a first battery pack, a second battery pack, a voltage transformation unit, a first switch, a second switch, a grounding terminal, and a control unit. A positive electrode of the first battery pack is coupled to the power supply terminal, and a negative electrode of the first battery pack is coupled to a positive electrode of the second battery pack; a negative electrode of the second battery pack is coupled to the grounding terminal; the voltage transformation unit is coupled between the negative electrode of the first battery pack and the second terminal of the first switch, and controls the first switch and the second switch to be connected or disconnected according to at least one of the temperature of the first battery pack, and the temperature of the second battery pack.

20 Claims, 5 Drawing Sheets

(51) Int. Cl.
    B60L 58/24       (2019.01)
    H02J 7/34       (2006.01)
    H02J 7/90       (2026.01)

(56)         References Cited

U.S. PATENT DOCUMENTS

| | | | |
|---|---|---|---|
| 2018/0145601 A1 | 5/2018 | Komatsu et al. | |
| 2018/0331544 A1* | 11/2018 | Dulle | G01R 31/50 |
| 2019/0366831 A1* | 12/2019 | Cafeo | H02J 7/0013 |
| 2020/0062140 A1* | 2/2020 | Zhou | B60L 50/64 |
| 2023/0059155 A1* | 2/2023 | Lesso | H02J 7/345 |
| 2024/0351473 A1* | 10/2024 | Ahmed | B60L 58/18 |

FOREIGN PATENT DOCUMENTS

| | | |
|---|---|---|
| CN | 109450063 A | 3/2019 |
| CN | 110682828 A | 1/2020 |
| CN | 111422100 A | 7/2020 |
| CN | 111628653 A | 9/2020 |
| CN | 112677821 A | 4/2021 |
| CN | 113346747 A | 9/2021 |
| CN | 113364084 A | 9/2021 |
| CN | 113650529 A | 11/2021 |
| CN | 113852164 A | 12/2021 |
| CN | 117183814 A | 12/2023 |
| DE | 102010001422 A1 | 8/2011 |
| DE | 102013226372 A1 | 6/2015 |
| JP | 2009142069 A * | 6/2009 |
| JP | 2020120566 A | 8/2020 |
| JP | 2022094749 A | 6/2022 |

OTHER PUBLICATIONS

Sep. 14, 2024—(CN) 2nd Office Action—App. No. 202210611784.6 w/ machine translation.

* cited by examiner

BATTERY CIRCUIT AND VEHICLE

CROSS-REFERENCE TO RELATED APPLICATIONS

The present disclosure is a continuation of PCT application PCT/CN2023/079720, filed on Mar. 6, 2023. PCT application PCT/CN2023/079720 claims priority to Chinese Patent Application No. 202210611784.6, filed on May 31, 2022. The above-referenced applications are incorporated herein by reference in their entirety.

FIELD

The present disclosure relates to the technical field of vehicles, and more specifically, to a battery circuit and a vehicle.

BACKGROUND

In the related technology, a dual battery pack including a power-type battery pack and an energy-type battery pack is provided.

Since temperature is an important parameter for batteries, how to control the dual battery pack, including the power-type battery pack and the energy-type battery pack, according to a temperature of the battery becomes a technical problem urgently to be addressed.

SUMMARY

The present disclosure is intended to provide a new technical solution for a battery circuit.

According to a first aspect of the present disclosure, a battery circuit is provided, which includes a power supply terminal, a first battery pack, a second battery pack of a different type from the first battery pack, a voltage transformation unit, a first switch, a second switch, a grounding terminal, and a control unit.

A positive electrode of the first battery pack is coupled with the power supply terminal. A negative electrode of the first battery pack is coupled with a positive electrode of the second battery pack.

A negative electrode of the second battery pack is coupled with the grounding terminal.

A first terminal of the first switch is coupled with the power supply terminal. A second terminal of the first switch is coupled with a first terminal of the second switch. A control terminal of the first switch is coupled with a first output terminal of the control unit.

A second terminal of the second switch is coupled with the grounding terminal. A control terminal of the second switch is coupled with a second output terminal of the control unit.

A voltage transformation unit is coupled between the negative electrode of the first battery pack and the second terminal of the first switch.

The control unit is configured to control the first switch and the second switch to be closed or opened according to at least one of a temperature of the first battery pack and the second battery pack and a temperature of the second battery pack.

According to an embodiment of the present disclosure, the control unit is configured to:

control the first switch and the second switch to be closed or opened according to a first preset control rule when any of an average temperature of the temperatures of the first battery pack and the second battery pack, a highest temperature of the temperatures of the first battery pack and the second battery pack, the temperature of the first battery pack, or the temperature of the second battery pack is less than a preset temperature, to cause the first battery pack and the second battery pack to be in a state of charging each other; and control the first switch and the second switch to be closed or opened according to a second preset control rule when any of the average temperature of the temperatures of the first battery pack and the second battery pack, the highest temperature of the temperatures of the first battery pack and the second battery pack, the temperature of the first battery pack, or the temperature of the second battery pack is greater than or equal to the preset temperature, to cause the first battery pack and the second battery pack to be in a state other than the state of charging each other.

According to an embodiment of the present disclosure, a deviation between a rated voltage of the first battery pack and a rated voltage of the second battery pack is less than a first preset range; and/or a deviation between a ratio of a capacity of the first battery pack to a capacity of the second battery pack and a ratio of a maximum discharge rate of the second battery pack to a maximum discharge rate of the first battery pack is less than a second preset range.

According to an embodiment of the present disclosure, the rated voltage of the first battery pack is the same as the rated voltage of the second battery pack; and/or the ratio of the capacity of the first battery pack to the capacity of the second battery pack is the same as the ratio of the maximum discharge rate of the second battery pack to the maximum discharge rate of the first battery pack.

According to an embodiment of the present disclosure, the first battery pack comprises a power-type battery pack; and the second battery pack comprises an energy-type battery pack; or the first battery pack comprises an energy-type battery pack; and the second battery pack comprises a power-type battery pack.

According to an embodiment of the present disclosure, the control unit includes a subtracter, a control subunit, a pulse-width modulation (PWM) signal generation subunit, and an inverter.

A first input terminal of the subtracter is configured to receive a current value of the first battery pack. A second input terminal of the subtracter is configured to receive a reference current value. An output terminal of the subtracter is coupled with an input terminal of the control subunit.

A first output terminal of the control subunit is coupled with an input terminal of the PWM signal generation subunit.

A first output terminal of the PWM signal generation subunit is coupled with the control terminal of the first switch. A second output terminal of the PWM signal generation subunit is coupled with an input terminal of the inverter.

An output terminal of the inverter is coupled with the control terminal of the second switch.

According to an embodiment of the present disclosure, the first battery pack comprises a power-type battery pack, and the second battery pack comprises an energy-type battery pack. The battery circuit further includes a filtering unit.

A first terminal of the filtering unit is coupled with the positive electrode of the first battery pack. A second terminal of the filtering unit is coupled with the power supply terminal. A third terminal of the filtering unit is coupled with the negative electrode of the first battery pack.

According to an embodiment of the present disclosure, the filtering unit includes a first inductor and a first capacitor.

A first terminal of the first inductor is coupled with the positive electrode of the first battery pack. A second terminal of the first inductor is coupled with the power supply terminal.

A first terminal of the first capacitor is coupled with the first terminal of the first inductor. A second terminal of the first capacitor is coupled with the negative electrode of the first battery pack.

According to an embodiment of the present disclosure, the battery circuit further includes a first freewheeling unit and a second freewheeling unit.

An input terminal of the first freewheeling unit is coupled with the second terminal of the first switch. An output terminal of the first freewheeling unit is coupled with the first terminal of the first switch.

An input terminal of the second freewheeling unit is coupled with the second terminal of the second switch. An output terminal of the second freewheeling unit is coupled with the first terminal of the second switch.

According to an embodiment of the present disclosure, the first freewheeling unit comprises a first diode, and the second freewheeling unit comprises a second diode.

An anode of the first diode is coupled with the second terminal of the first switch. A cathode of the first diode is coupled with the first terminal of the first switch.

An anode of the second diode is coupled with the second terminal of the second switch. A cathode of the second diode is coupled with the first terminal of the second switch.

According to an embodiment of the present disclosure, the battery circuit further includes a voltage stabilization unit.

The voltage stabilization unit is coupled between the power supply terminal and the grounding terminal.

According to an embodiment of the present disclosure, the voltage stabilization unit comprises a second capacitor.

According to an embodiment of the present disclosure, the voltage transformation unit comprises a second inductor.

According to a second aspect of the present disclosure, a vehicle is provided. The vehicle includes the battery circuit in any implementation of the foregoing first aspect.

According to the battery circuit provided in an embodiment of the present disclosure, self-heating of a dual battery pack including the first battery pack and the second battery pack can be controlled according to a temperature of a battery.

Other features and advantages of the present disclosure will become clear from the following detailed description of exemplary embodiments of the present disclosure provided with reference to drawings.

BRIEF DESCRIPTION OF THE DRAWINGS

Drawings that are incorporated into and constitute a part of the specification illustrate embodiments of the present disclosure, and are used to explain the principle of the present disclosure together with the description thereof.

In the drawings.

Figure 1:
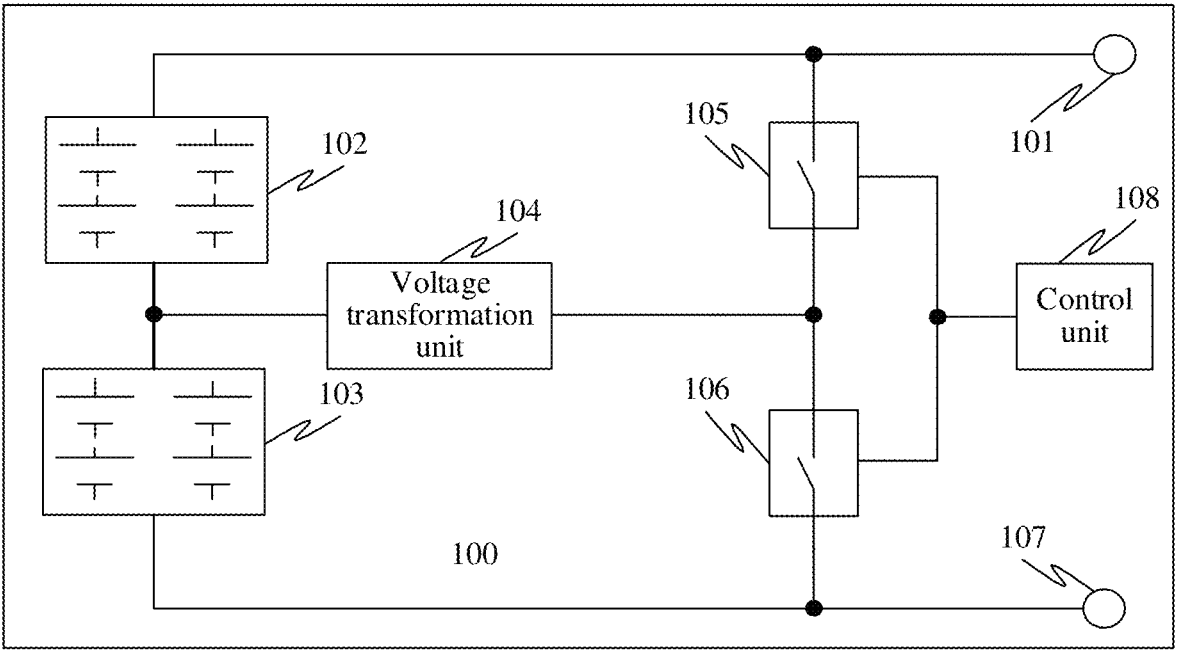
FIG. 1 is a schematic structural diagram I of a battery circuit according to an embodiment of the present disclosure.

100—Battery circuit; 101—Power supply terminal; 102—First battery pack; 103—Second battery pack; 104—Voltage transformation unit; 1041—Second inductor; 105—First switch; 106—Second switch; 107—Grounding terminal; 108—Control unit; 1081—Subtracter; 1082—Control subunit; 1083—Pulse-width modulation (PWM) signal generation subunit; 1084—Inverter; 1085—Switch opening signal generation subunit; 109—Filtering unit; 1091—First inductor; 1092—First capacitor; 110—First freewheeling unit; 1101—First diode; 111—Second freewheeling unit; 1111—Second diode; 112—Voltage stabilization unit; 1121—Second capacitor.

DETAILED DESCRIPTION

Various exemplary embodiments of the present disclosure are described in detail with reference to drawings. It should be noted that, unless otherwise specified, relative arrangement, numerical expressions, and numerical values of components and steps described in the embodiments do not limit the scope of the present disclosure.

The following descriptions of at least one exemplary embodiment are merely illustrative, and in no way constitute any limitation on the present disclosure and the application or use thereof.

Technologies, methods, and devices known to a person of ordinary skill in the related art may not be discussed in detail, but where appropriate, the techniques, the methods, and the devices should be considered as a part of the specification.

In examples shown and discussed herein, any specific value should be construed as merely exemplary and not as a limitation. Therefore, other examples of the exemplary embodiments may have different values.

It should be noted that, similar reference numerals and letters represent similar items in the following drawings. Therefore, once an item is defined in a drawing, the item does not need to be further discussed in subsequent drawings.

An embodiment of the present disclosure provides a battery circuit 100. As shown in FIG. 1, the battery circuit 100 includes a power supply terminal 101, a first battery pack 102, a second battery pack 103 of a different type from the first battery pack 102, a voltage transformation unit 104, a first switch 105, a second switch 106, a grounding terminal 107, and a control unit 108.

A positive electrode of the first battery pack 102 is coupled with the power supply terminal 101. A negative electrode of the first battery pack 102 is coupled with a positive electrode of the second battery pack 103.

A negative electrode of the second battery pack 103 is coupled with the grounding terminal 107.

A first terminal of the first switch 105 is coupled with the power supply terminal 101. A second terminal of the first switch 105 is coupled with a first terminal of the second switch 106. A control terminal of the first switch 105 is coupled with a first output terminal of the control unit 108.

A second terminal of the second switch 106 is coupled with the grounding terminal 107. A control terminal of the second switch 106 is coupled with a second output terminal of the control unit 108.

The voltage transformation unit 104 is coupled between the negative electrode of the first battery pack 102 and the second terminal of the first switch 105.

The control unit 108 is configured to control the first switch 105 and the second switch 106 to be closed or opened according to at least one of a temperature of the first battery pack 102 and a temperature of the second battery pack 103.

In this embodiment of the present disclosure, the battery circuit is provided, which includes the power supply terminal, the first battery pack, the second battery pack of a different type from the first battery pack, the voltage transformation unit, the first switch, the second switch, the grounding terminal, and the control unit. The positive electrode of the first battery pack is coupled with the power supply terminal. The negative electrode of the first battery pack is coupled with the positive electrode of the second battery pack. The negative electrode of the second battery pack is coupled with the grounding terminal. The first terminal of the first switch is coupled with the power supply terminal. The second terminal of the first switch is coupled with the first terminal of the second switch. The control terminal of the first switch is coupled with the first output terminal of the control unit. The second terminal of the second switch is coupled with the grounding terminal. The control terminal of the second switch is coupled with the second output terminal of the control unit. The voltage transformation unit is coupled between the negative electrode of the first battery pack and the second terminal of the first switch. The control unit is configured to control the first switch and the second switch to be closed or opened according to at least one of the temperature of the first battery pack and the second battery pack and the temperature of the second battery pack. According to the battery circuit, self-heating of a dual battery pack including the first battery pack and the second battery pack can be controlled according to a temperature of a battery.

In this embodiment of the present disclosure, when the battery circuit 100 is in a discharging state, the power supply terminal 101 in the battery circuit 100 is configured to connect to or be coupled with a power input terminal of a load, and the grounding terminal 107 in the battery circuit 100 is configured to connect to or be coupled with a grounding terminal of the load. Exemplarily, the load may be a motor of an electric vehicle or a hybrid vehicle.

Alternatively, when the battery circuit 100 is in a charging state, the power supply terminal 101 in the battery circuit 100 is configured to connect to or be coupled with a power output terminal of a charging device, and the grounding terminal 107 in the battery circuit 100 is configured to connect to or be coupled with a grounding terminal of the charging device. Exemplarily, the charging device may be a charging pile or a braking system of an electric vehicle or a hybrid vehicle.

Figure 4:
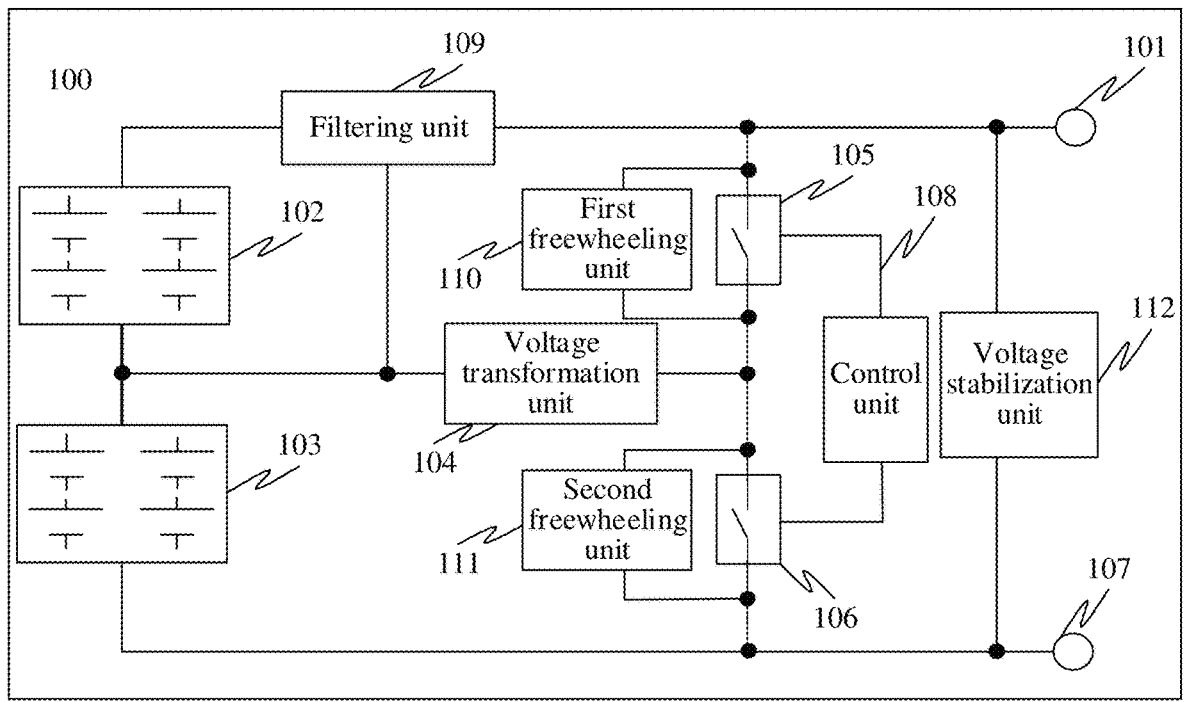
FIG. 4 is a schematic structural diagram II of the battery circuit according to an embodiment of the present disclosure.

In an embodiment of the present disclosure, as shown in FIG. 4, the voltage transformation unit 104 may be a second inductor 1041. The voltage transformation unit 104 may be implemented in another manner.

In an embodiment of the present disclosure, an inductance value of the second inductor 1041 may be set to a range of 2 μH to 1500 μH.

In this embodiment of the present disclosure, the voltage transformation unit 104 has a low cost and a simple structure when the voltage transformation unit 104 comprises the second inductor 1041.

In an embodiment of the present disclosure, the first switch 105 and the second switch 106 may be switch devices such as a switch IC, a metal oxide semiconductor field effect transistor (MOSFET), an insulated gate bipolar transistor (IGBT), or a silicon carbide (SiC) switch.

It should be noted that, in this embodiment of the present disclosure, the first switch 105 and the second switch 106 are switches of a same type. To be specific, when the control terminals of the first switch and the second switch receive a high level, the first switch 105 and the second switch 106 are both closed or opened. When the control terminals of the first switch and the second switch receive a low level, the first switch 105 and the second switch 106 are both opened or closed.

In this embodiment of the present disclosure, the first battery pack 102 and the second battery pack 103 are of different types. Specifically, the first battery pack 102 comprises a power-type battery pack, and the second battery pack 103 comprises an energy-type battery pack. Alternatively, the first battery pack 102 comprises an energy-type battery pack, and the second battery pack 103 comprises a power-type battery pack.

In this embodiment of the present disclosure, the power-type battery pack is a battery pack with a high power density. The power density is a maximum energy transfer power during charging/discharging of a battery with a unit weight or volume. In addition, in this embodiment of the present disclosure, a voltage value of the power-type battery pack may be set to a range of 100 V to 1000 V.

The energy-type battery pack is a battery pack with a high energy density. The energy density is energy stored in a battery with a unit weight or volume. In addition, in this embodiment of the present disclosure, a voltage value of the energy-type battery pack may be set to a range of 100 V to 1000 V.

In this embodiment of the present disclosure, specific types of the first battery pack 102 and the second battery pack 103 are not limited, which can improve compatibility of the battery circuit 100 provided in the embodiments of the present disclosure.

In this embodiment of the present disclosure, that the control unit 108 is configured to control the first switch 105 and the second switch 106 to be closed or opened according to at least one of the temperature of the first battery pack 102 and the temperature of the second battery pack 103 may be specifically implemented in the following two manners.

First manner: The first switch 105 and the second switch 106 are controlled to be closed or opened according to a first preset control rule when any of an average temperature of the temperatures of the first battery pack 102 and the second battery pack 103, a highest temperature of the temperatures of the first battery pack 102 and the second battery pack 103, the temperature of the first battery pack 102, or the temperature of the second battery pack 103 is less than a preset temperature, to cause the first battery pack 102 and the second battery pack 103 to be in a state of charging each other.

In this embodiment of the present disclosure, the temperature of the first battery pack 102 is usually similar to the temperature of the second battery pack 103. Therefore, the temperature of any of the first battery pack 102 and the second battery pack 103, the average temperature of the first battery pack and the second battery pack, or the highest temperature of the temperatures of the first battery pack and the second battery pack may represent a temperature of the dual battery pack including the first battery pack 102 and the second battery pack 103.

In an example, the temperature of the first battery pack 102 may be calculated according to a resistance value of an internal resistor in the first battery pack 102 with a temperature coefficient. Similarly, the temperature of the second battery pack 103 may be calculated according to a resistance value of an internal resistor in the second battery pack 103 with a temperature coefficient.

It should be noted that a manner of obtaining the temperature of the first battery pack 102 and the temperature of the second battery pack 103 of the control unit 108 is not limited in this embodiment of the present disclosure.

In this embodiment of the present disclosure, the preset temperature is a minimum temperature at which the battery pack can operate stably. When the temperature of any of the second battery pack 102 and the second battery pack 103, the average temperature of the temperatures of the second battery pack and the second battery pack, or the highest temperature of the temperatures of the second battery pack and the second battery pack is less than the preset temperature, it indicates that the first battery pack 102 and the second battery pack 103 cannot operate stably.

In an example, the preset temperature may be set to −10° C.

In this embodiment of the present disclosure, the first preset control rule may be a controlling the first battery pack 102 to be discharged to charge the second battery pack 103 within a first time period and controlling the second battery pack 103 to be discharged to charge the first battery pack 102 within a second time period. The second time period is a time period adjacent to the first time period and before or after the first time period. Durations corresponding to the first time period and the second time period are the same, which may be set according to past experience.

Based on the above, the first preset control rule is performing an on/off operation, which includes controlling the first switch 105 to be closed and the second switch 106 to be opened within a first sub-time period; controlling the first switch 105 to be opened and the second switch 106 to be closed within a second sub-time period; controlling the first switch 105 to be opened and the second switch 106 to be closed within a third sub-time period; and controlling the first switch 105 to be closed and the second switch 106 to be opened within a fourth sub-time period. The on/off operation is repeated.

The second sub-time period is a time period adjacent to the first sub-time period and after the first sub-time period. Durations corresponding to the first sub-time period and the second sub-time period may be set according to past experience. In addition, the first sub-time period and the second sub-time period form the first time period.

Correspondingly, the fourth sub-time period is a time period adjacent to the third sub-time period and after the third sub-time period. Durations corresponding to the third sub-time period and the fourth sub-time period may be set according to past experience. In addition, the third sub-time period and the fourth sub-time period form the second time period.

In this embodiment of the present disclosure, the first switch 105 is controlled to be closed and the second switch 106 is controlled to be opened within the first sub-time period. In this case, the first battery pack 102 charges the voltage transformation unit 104. The first switch 105 is controlled to be opened and the second switch 106 is controlled to be closed within the second sub-time period. In this case, the voltage transformation unit 104 releases the stored power to the second battery pack 103. In other words, the voltage transformation unit 104 implements a boosting function. In this way, the first battery pack 102 can charge the second battery pack 103.

The first switch 105 is controlled to be opened and the second switch 106 is controlled to be closed within the third sub-time period. In this case, the second battery pack 103 charges the voltage transformation unit 104. The first switch 105 is controlled to be closed and the second switch 106 is controlled to be opened within the fourth sub-time period. In this case, the voltage transformation unit 104 releases stored power to the first battery pack 102. In other words, the voltage transformation unit 104 implements a boosting function. In this way, the second battery pack 103 can charge the first battery pack 102.

In this embodiment, due to the internal resistors of the first battery pack 102 and the second battery pack 103, the temperatures of the first battery pack 102 and the second battery pack 103 can be increased to be greater than or equal to the preset temperature through self-heating during charging each other. When the temperatures of the first battery pack 102 and the second battery pack 103 are increased to be greater than or equal to the preset temperature through self-heating, the first battery pack 102 and the second battery pack 103 can operate stably.

Second manner: The first switch 105 and the second switch 106 are controlled to be closed or opened according to a second preset control rule when any of the average temperature of the temperatures of the first battery pack 102 and the second battery pack 103, the highest temperature of the temperatures of the first battery pack 102 and the second battery pack 103, the temperature of the first battery pack 102, or the temperature of the second battery pack 103 is greater than or equal to the preset temperature, to cause the first battery pack 102 and the second battery pack 103 to be in a state other than the state of charging each other.

In this embodiment of the present disclosure, the second preset control rule is a rule different from the first preset control rule. In an example, the second preset control rule may be controlling both the first switch 105 and the second switch 106 to be opened.

In this embodiment of the present disclosure, when any of the average temperature of the temperatures of the first battery pack 102 and the second battery pack 103, the highest temperature of the temperatures of the first battery pack 102 and the second battery pack 103, the temperature of the first battery pack 102, or the temperature of the second battery pack 103 is greater than or equal to the preset temperature, it indicates that the first battery pack 102 and the second battery pack 103 can operate stably. In this case, the first switch 105 and the second switch 106 are controlled to be closed or opened according to the second preset control rule, to cause the first battery pack 102 and the second battery pack 103 to be in a state other than the state of charging each other, that is, not to perform self-heating. For example, both the first switch 105 and the second switch 106 are controlled to be opened, to connect the first battery pack 102 and the second battery pack 103 in series for discharging.

In this embodiment of the present disclosure, the battery circuit is provided, which includes the power supply terminal, the first battery pack, the second battery pack of a different type from the first battery pack, the voltage transformation unit, the first switch, the second switch, the grounding terminal, and the control unit. The positive electrode of the first battery pack is coupled with the power supply terminal. The negative electrode of the first battery pack is coupled with the positive electrode of the second battery pack. The negative electrode of the second battery pack is coupled with the grounding terminal. The first terminal of the first switch is coupled with the power supply terminal. The second terminal of the first switch is coupled with the first terminal of the second switch. The control terminal of the first switch is coupled with the first output terminal of the control unit. The second terminal of the second switch is coupled with the grounding terminal. The control terminal of the second switch is coupled with the second output terminal of the control unit. The voltage transformation unit is coupled between the negative electrode of the first battery pack and the second terminal of the first switch. The control unit is configured to control the first switch and the second switch to be closed or opened according to at least one of the temperature of the first battery pack and the second battery pack and the temperature of the second battery pack. According to the battery circuit, self-heating of a dual battery pack including the first battery pack and the second battery pack can be controlled according to a temperature of a battery.

In this embodiment of the present disclosure, a deviation between a rated voltage U1 of the first battery pack 102 and a rated voltage U2 of the second battery pack 103 is less than a first preset range.

In this embodiment of the present disclosure, the first preset range is an allowable range of the deviation between the rated voltage U1 of the first battery pack 102 and the rated voltage U3 of the second battery pack 103. When the deviation between the rated voltage U1 of the first battery pack 102 and the rated voltage U2 of the second battery pack 103 is less than the first preset range, it indicates that the rated voltage U1 of the first battery pack 102 is substantially the same as the rated voltage U2 of the second battery pack 103.

In an embodiment of the present disclosure, the first preset range may exemplarily be 0.2*U1 or 0.2*U2. When the first preset range is 0.2*U1, 1.2*U1>U2>0.8*U1. When the first preset range is 0.2*U2, 1.2*U2>U1>0.8*U2.

It should be noted that, a specific value of the first preset range is not limited in this embodiment of the present disclosure.

In this embodiment of the present disclosure, when the deviation between the rated voltage U1 of the first battery pack 102 and the rated voltage U2 of the second battery pack 103 is less than the first preset range, efficient energy transfer can be achieved between the first battery pack 102 and the second battery pack 103. For example, efficient mutual charging can be achieved between the first battery pack 102 and the second battery pack 103.

It should be noted that, generally, a sum of the rated voltage U1 of the first battery pack 102 and the rated voltage U1 of the second battery pack 103 is equal to a total voltage Uout required for the load, that is, U1+U2=Uout.

In an embodiment of the present disclosure, the rated voltage U1 of the first battery pack 102 is the same as the rated voltage U2 of the second battery pack 103. In this way, most efficient energy transfer can be achieved between the first battery pack 102 and the second battery pack 103.

Based on the above, in an example, Uout=550V. In this case, U1=U2=275V may be set.

In this embodiment of the present disclosure, a deviation between a ratio of a capacity Q1 of the first battery pack 102 to a capacity Q2 of the second battery pack 103 and a ratio of a maximum discharge rate X2 of the second battery pack 103 to a maximum discharge rate X1 of the first battery pack 102 is less than a second preset range.

The maximum discharge rate represents a ratio of a maximum discharging current of the battery pack to a battery capacity. For example, if a maximum discharging current of a battery pack with a battery capacity of 10 Ah is 50 A, a maximum discharge rate thereof is 50 A/10 Ah=5 C.

In this embodiment of the present disclosure, the second preset range is an allowable range of the deviation between the ratio of the capacity Q1 of the first battery pack 102 to the capacity Q2 of the second battery pack 103 and the ratio of the maximum discharge rate X2 of the second battery pack 103 to the maximum discharge rate X1 of the first battery pack 102. When the deviation between the ratio of the capacity Q1 of the first battery pack 102 to the capacity Q2 of the second battery pack 103 and the ratio of the maximum discharge rate X2 of the second battery pack 103 to the maximum discharge rate X1 of the first battery pack 102 is less than the second preset range, it indicates that the ratio of the capacity Q1 of the first battery pack 102 to the capacity Q2 of the second battery pack 103 is substantially the same as the ratio of the maximum discharge rate X2 of the second battery pack 103 to the maximum discharge rate X1 of the first battery pack 102.

In an embodiment of the present disclosure, the second preset range may exemplarily be ±0.5.

It should be noted that, a specific value of the second preset range is not limited in this embodiment of the present disclosure.

In this embodiment of the present disclosure, when the deviation between the ratio of the capacity of the first battery pack 102 to the capacity of the second battery pack 103 and the ratio of the maximum discharge rate of the second battery pack 103 to the maximum discharge rate of the first battery pack 101 is less than the second preset range, maximum discharging currents of the two battery packs can be substantially the same. Based on the above, for example, the two battery packs can be connected in series for stable discharging.

It should be noted that, generally, a sum of the capacity Q1 of the first battery pack 102 and the capacity Q2 of the second battery pack 103 is equal to a total capacity Qnom required for the load, that is, Q1+Q2=Qnom.

In an embodiment of the present disclosure, the ratio of the capacity Q1 of the first battery pack 102 to the capacity Q2 of the second battery pack 103 is the same as the ratio of the maximum discharge rate X2 of the second battery pack 103 to the maximum discharge rate X1 of the first battery pack 102. In this way, the maximum discharging currents of the two battery packs can be exactly the same.

Based on the above, in an example, Qnom=120 Ah. In this case, Q1=100 Ah, Q2=20 Ah, X1=1 C, and X2=5 C may be set.

In an embodiment of the present disclosure, the control unit 108 may control the first switch 105 and the second switch 106 to be closed or opened according to the first preset control rule through a pulse-width modulation (PWM) signal. The first switch 105 and the second switch 106 are controlled to be opened and closed according to the PWM signal. Opening durations and closing durations of the first switch and the second switch 106 are controlled according to a duty cycle of the PWM signal.

Figure 2:
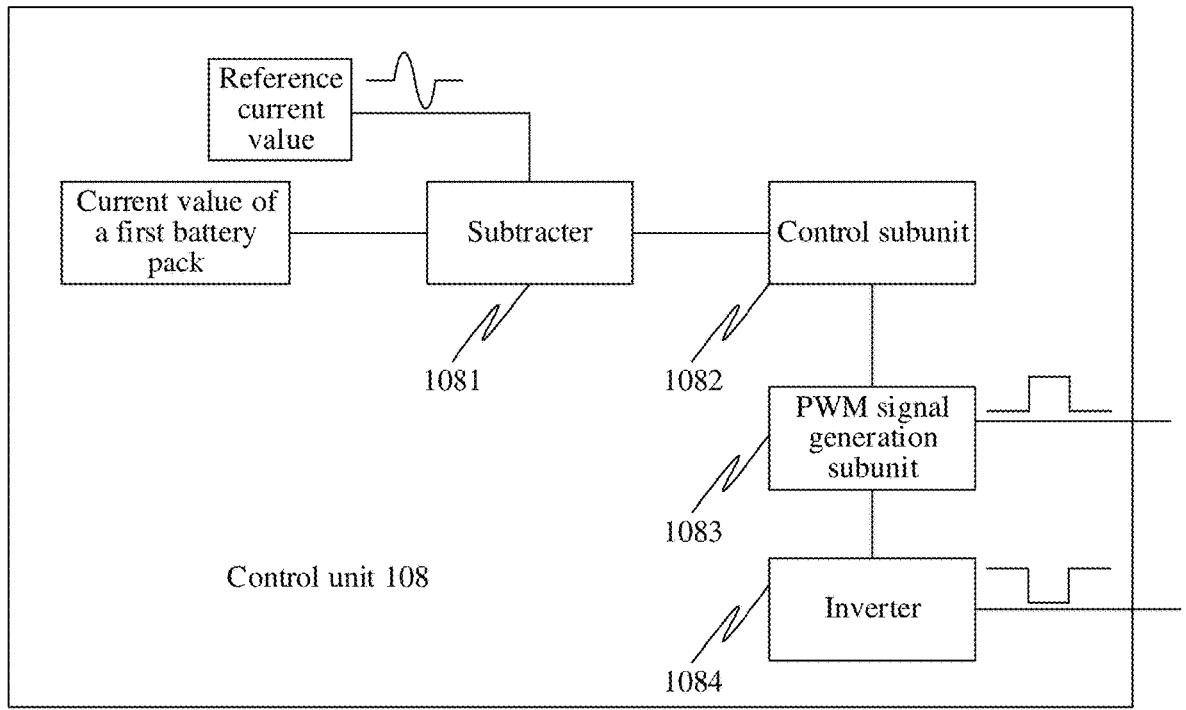
FIG. 2 is a schematic structural diagram of a control unit according to an embodiment of the present disclosure.

In an embodiment of the present disclosure, to implement the foregoing PWM signal, as shown in FIG. 2, the control unit 108 includes a subtracter 1081, a control subunit 1082, a PWM signal generation subunit 1083, and an inverter 1084.

A first input terminal of the subtracter 1081 is configured to receive a current value of the first battery pack 102. A second input terminal of the subtracter 1081 is configured to receive a reference current value. An output terminal of the subtracter 1081 is coupled with an input terminal of the control subunit 1082.

A first output terminal of the control subunit 1082 is coupled with an input terminal of the PWM signal generation subunit 1083.

A first output terminal of the PWM signal generation subunit 1083 is coupled with the control terminal of the first switch 105. A second output terminal of the PWM signal generation subunit 1083 is coupled with an input terminal of the inverter 1084.

An output terminal of the inverter 1084 is coupled with the control terminal of the second switch 106.

In this embodiment of the present disclosure, the control subunit 1082 stores a preset temperature. The control subunit 108 is configured to obtain the average temperature of the temperatures of the first battery pack 105 and the temperature of the second battery pack 106, the highest temperature of the temperature of the first battery pack 105 and the temperature of the second battery pack 106, the temperature of the first battery pack 102, or the temperature of the second battery pack 103.

In an embodiment of the present disclosure, the control subunit 1082 may exemplarily be a microcontroller unit (MCU), a central processing unit (CPU), or the like.

In this embodiment of the present disclosure, a current value of an output current of the first battery pack 102 may be detected through a current value detection unit. The current value detection unit transmits the current value of the output current of the first battery pack 102 to the first input terminal of the subtracter 1081 after detecting the current value.

In this embodiment of the present disclosure, a manner in which the subtracter 1081 receives the current value of the output current of the first battery pack 102 and the reference current value is not limited.

In this embodiment of the present disclosure, the subtracter 1082 is configured to calculate a difference between the current value of the first battery pack 102 and the reference current value. The reference current value is usually set to a value of a sine wave current or a square wave current. In an example, a frequency f of the sine wave current or square wave current may be set to a range of 10 Hz to 2000 Hz, and an amplitude A may be set to a range of 5 to 200.

The control subunit 1082 is further configured to generate a PWM signal generation instruction according to a calculation result of the subtracter 1081 when the average temperature of the temperatures of the first battery pack 105 and the temperature of the second battery pack 106, the highest temperature of the temperature of the first battery pack 105 and the temperature of the second battery pack 106, the temperature of the first battery pack 102, or the temperature of the second battery pack 103 is less than the preset temperature, and output the PWM signal generation instruction to the PWM signal generation subunit 1083.

The PWM signal generation subunit 1083 is configured to output a PWM signal with an adjustable duty cycle under control of the control subunit 1082.

The inverter 1084 is configured to invert a level outputted by the PWM signal generation subunit 1083.

In this embodiment of the present disclosure, the PWM signal generated by the PWM signal generation subunit 1083 may be used to control the first battery pack 102 to charge the second battery pack 103 when the reference current value is greater than 0. Correspondingly, when the reference current value is less than 0, the second battery pack 103 is controlled to charge the first battery pack 102.

In this embodiment of the present disclosure, the control unit 108 with a simple structure is provided. In this way, design difficulty of the battery circuit provided in the embodiments of the present disclosure can be reduced.

Figure 3:
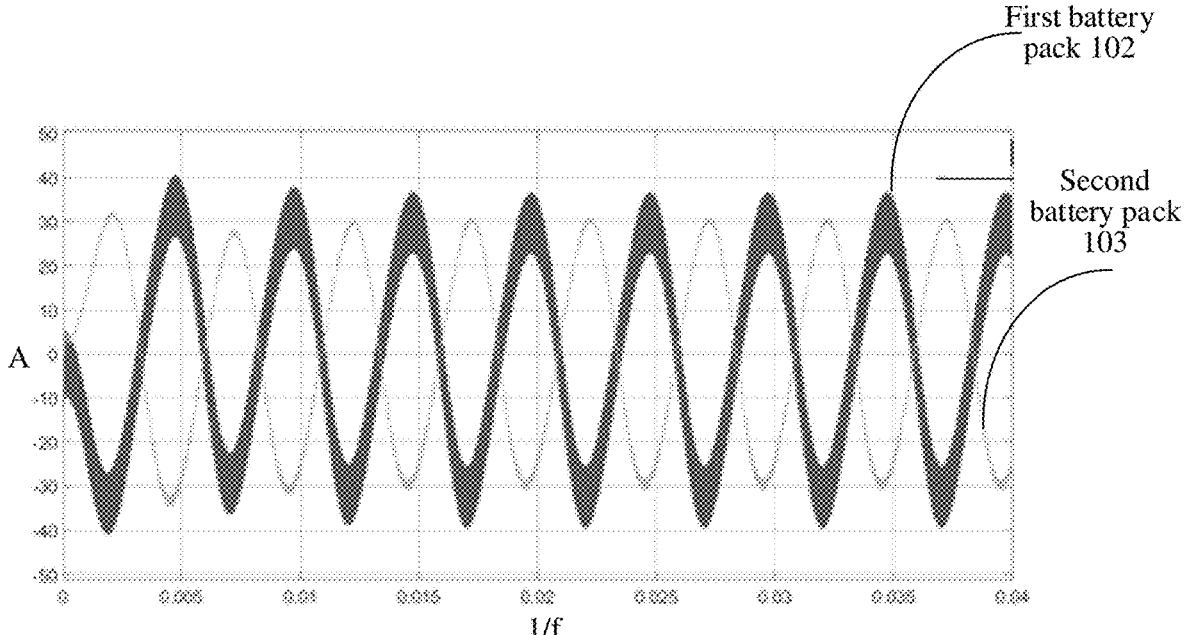
FIG. 3 is a simulated operating current diagram of a first battery pack and a second battery pack according to an embodiment of the present disclosure.

In an embodiment of the present disclosure, if the preset temperature is −10° C., the first battery pack 102 comprises a power-type battery pack, the second battery pack 103 comprises an energy-type battery pack, the reference current is a sine wave, a frequency f of the sine wave is 200 Hz, and an amplitude A of the sine wave is 30, a simulated result of an operating current of the first battery pack 102 and an operating current of the second battery pack 103 may be shown in FIG. 3.

It should be noted that, in this embodiment of the present disclosure, the subtracter 1081 may periodically receive the current value of the output current of the first battery pack 102. In this way, closed-loop negative feedback regulation can be achieved, so that the duty cycle of the PWM signal generated by the PWM signal generation subunit 1083 may be changed, thereby causing the temperatures of the first battery pack 102 and the second battery pack 103 to be greater than or equal to the preset temperature through self-heating more quickly.

In an embodiment of the present disclosure, when the first battery pack 102 comprises a power-type battery pack and the second battery pack 103 comprises an energy-type battery pack, as shown in FIG. 4, the battery circuit 100 provided in this embodiment of the present disclosure further includes a filtering unit 109.

A first terminal of the filtering unit 109 is coupled with the positive electrode of the first battery pack 102. A second terminal of the filtering unit 109 is coupled with the power supply terminal 101. A third terminal of the filtering unit 109 is coupled with the negative electrode of the first battery pack 102.

In this embodiment of the present disclosure, since the power-type battery pack is usually used when a peak power is generated during the traveling of the electric vehicle or the hybrid vehicle (such as the peak discharging power generated during traction and the peak charging power generated during the braking), in other cases, an output current of the power-type battery pack is expected to be 0. In these cases, arranging the filtering unit 109 can suppress a current ripple of the first battery pack 102, to prevent the output current of the power-type battery pack (the first battery pack 102) from fluctuating around 0. In this way, high-frequency rapid charging/discharging of the first battery pack 102 can be avoided, thereby reducing a life decrease of the first battery pack 102.

Figure 5:
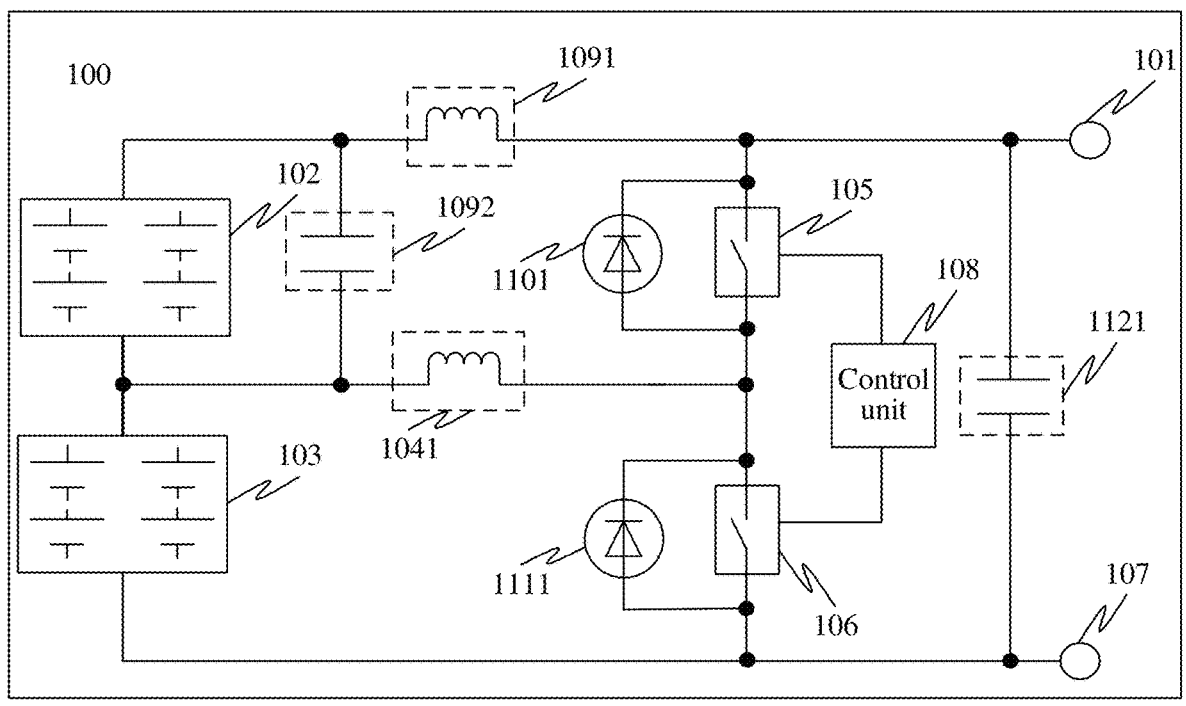
FIG. 5 is a schematic structural diagram III of the battery circuit according to an embodiment of the present disclosure.

In an embodiment of the present disclosure, as shown in FIG. 5, the filtering unit 109 includes a first inductor 1091 and a first capacitor 1092.

A first terminal of the first inductor 1091 is coupled with the positive electrode of the first battery pack 102. A second terminal of the first inductor 1091 is coupled with the power supply terminal.

A first terminal of the first capacitor 1092 is coupled with the first terminal of the first inductor 1091. A second terminal of the first capacitor 1092 is coupled with the negative electrode of the first battery pack 102.

A filtering unit 109 of another structure may also be used, which is not described in detail in this embodiment of the present disclosure.

In this embodiment of the present disclosure, the first inductor 1091 is a filter inductor, and the first inductor 1091 may be configured with a value in a range of 2 μH to 1500 μH. The first capacitor 1092 is a filter capacitor, the first capacitor 1092 may be configured with a value a range of 2 μF to 1500 μF.

It should be noted that, when the first battery pack 102 has a filtering function, the first inductor 1091 and the first capacitor 1092 may be configured with relatively small values. For example, the first inductor 1091 may be configured with a value of 2 μH, and the first capacitor 1092 may be configured with a value of 2 μF.

Correspondingly, when the first battery pack 102 does not have the filtering function, the first inductor 1091 and the first capacitor 1092 may be configured with relatively large values. For example, the first inductor 1091 may be configured with a value of 1500 μH, and the first capacitor 1092 may be configured with a value of 1500 μF.

In this embodiment of the present disclosure, the filtering unit 109 with a simple structure is provided, which can reduce hardware costs, design difficulty, and a footprint of the battery circuit 100.

In an embodiment of the present disclosure, as shown in FIG. 4, the battery circuit 100 provided in this embodiment of the present disclosure further includes a first freewheeling unit 110 and a second freewheeling unit 111.

An input terminal of the first freewheeling unit 110 is coupled with the second terminal of the first switch 105. An output terminal of the first freewheeling unit 110 is coupled with the first terminal of the first switch 105.

An input terminal of the second freewheeling unit 111 is coupled with the second terminal of the second switch 106. An output terminal of the second freewheeling unit 111 is coupled with the first terminal of the second switch 106.

In this embodiment of the present disclosure, at an initial moment of closing the second switch 106 and opening the first switch 105, the first switch 105 usually cannot be controlled to be immediately opened as a result of freewheeling time and action time of the first switch 105. As a result, a short circuit quickly occurs between the first switch 105 and the second switch 106, which causes the first battery pack 102 and the second battery pack 103 to be burnt.

In this embodiment of the present disclosure, the second freewheeling unit 111 is coupled in parallel with the two terminals of the second switch 106, and the second freewheeling unit 111 performs freewheeling. In this way, closing time of the second switch 106 can be delayed during control of the first switch 105 to be opened, thereby preventing the first battery pack 102 and the second battery pack 103 from being burnt.

Similarly, the first freewheeling unit 110 is coupled in parallel with the two terminals of the first switch 105, and the first freewheeling unit 110 performs freewheeling. In this way, closing time of the first switch 105 can be delayed during control of the second switch 106 to be opened, thereby preventing the first battery pack 102 and the second battery pack 103 from being burnt.

In an embodiment of the present disclosure, as shown in FIG. 5, the first freewheeling unit 110 is a first diode 1101, and the second freewheeling unit 111 is a second diode 1111.

An anode of the first diode 1101 is coupled with the second terminal of the first switch 105. A cathode of the first diode 1101 is coupled with the first terminal of the first switch 105.

An anode of the second diode 1111 is coupled with the second terminal of the second switch 106. A cathode of the second diode 1111 is coupled with the first terminal of the second switch 106.

In this embodiment of the present disclosure, the first freewheeling unit 110 and the second freewheeling unit 111 with a simple structure are provided, which can reduce hardware costs, design difficulty, and a footprint of the battery circuit 100.

In an embodiment of the present disclosure, as shown in FIG. 4, the battery circuit 100 provided in this embodiment of the present disclosure further includes a voltage stabilization unit 112.

The voltage stabilization unit 1121 is coupled between the power supply terminal 101 and the grounding terminal 107.

In this embodiment of the present disclosure, the voltage stabilization unit 112 is configured to filter out a voltage fluctuation on a bus, that is, a line on which the power supply terminal 101 of the battery circuit 100 is located, which can stabilize a voltage supplied to the load, and is further configured to reduce negative impact of a voltage fluctuation jointly generated by the first battery pack 102 and the voltage transformation unit 104 on the second battery pack 103.

In an embodiment of the present disclosure, as shown in FIG. 5, the voltage stabilization unit 112 may exemplarily be a second capacitor 1121. The voltage stabilization unit 112 may be implemented in another manner.

In an embodiment of the present disclosure, the second capacitor 1121 is a support capacitor, and the second capacitor 1121 may be configured with a value in a range of 2 μF to 1500 μF.

In this embodiment of the present disclosure, the voltage stabilization unit 112 with a simple structure is provided, which can reduce hardware costs, design difficulty, and a footprint of the battery circuit 100.

An embodiment of the present disclosure further provides a vehicle. The vehicle includes the battery circuit 100 in any of the foregoing embodiments.

In this embodiment of the present disclosure, the vehicle includes an electric vehicle or a hybrid vehicle.

The embodiments of the present disclosure have been described above. The above description is exemplary and non-exhaustive, and the present disclosure is not limited to the disclosed embodiments. Many modifications and changes made without departing from the scope and the spirit of the various embodiments are apparent to a person of ordinary skill in the art. The selection of the terms used herein is intended to provide best explanation of the principles, practical applications of the various embodiments, or technical improvements of the technologies in the market, or to enable others of ordinary skill in the art to understand the embodiments disclosed herein. The scope of the present disclosure is defined by the appended claims.

What is claimed is:

1. A battery circuit comprising a power supply terminal, a first battery pack, a second battery pack of a different type from the first battery pack, a voltage transformation unit, a first switch, a second switch, a grounding terminal, a control unit and a filtering unit, wherein:

a positive electrode of the first battery pack is coupled with the power supply terminal;

a negative electrode of the first battery pack is coupled with a positive electrode of the second battery pack;

a negative electrode of the second battery pack is coupled with the grounding terminal;

a first terminal of the first switch is coupled with the power supply terminal;

a second terminal of the first switch is coupled with a first terminal of the second switch;

a control terminal of the first switch is coupled with a first output terminal of the control unit; a second terminal of the second switch is coupled with the grounding terminal;

a control terminal of the second switch is coupled with a second output terminal of the control unit;

the voltage transformation unit is coupled between the negative electrode of the first battery pack and the second terminal of the first switch;

a first terminal of the filtering unit is coupled with the positive electrode of the first battery pack;

a second terminal of the filtering unit is coupled with the power supply terminal;

a third terminal of the filtering unit is coupled with the negative electrode of the first battery pack; and the control unit is configured to control the first switch and the second switch to be closed or opened according to at least one of a temperature of the first battery pack and a temperature of the second battery pack.

2. The battery circuit according to claim 1, wherein the control unit is further configured to:

control the first switch and the second switch to be closed or opened according to a first preset control rule that causes the first battery pack and the second battery pack to be in a state of charging each other, after a determination that any of an average temperature of the temperatures of the first battery pack and the second battery pack, a highest temperature of the temperatures of the first battery pack and the second battery pack, the temperature of the first battery pack, or the temperature of the second battery pack is less than a preset temperature; and control the first switch and the second switch to be closed or opened according to a second preset control rule that causes the first battery pack and the second battery pack to be in a state other than the state of charging each other, after a determination that any of the average temperature of the temperatures of the first battery pack and the second battery pack, the highest temperature of the temperatures of the first battery pack and the second battery pack, the temperature of the first battery pack, or the temperature of the second battery pack is greater than or equal to the preset temperature.

3. The battery circuit according to claim 1, wherein a deviation between a rated voltage of the first battery pack and a rated voltage of the second battery pack is less than a first preset range; and/or a deviation between a ratio of a capacity of the first battery pack to a capacity of the second battery pack and a ratio of a maximum discharge rate of the second battery pack to a maximum discharge rate of the first battery pack is less than a second preset range.

4. The battery circuit according to claim 3, wherein the rated voltage of the first battery pack is same as the rated voltage of the second battery pack; and/or the ratio of the capacity of the first battery pack to the capacity of the second battery pack is same as the ratio of the maximum discharge rate of the second battery pack to the maximum discharge rate of the first battery pack.

5. The battery circuit according to claim 1, wherein the first battery pack comprises a power-type battery pack; and the second battery pack comprises an energy-type battery pack; or the first battery pack comprises the energy-type battery pack; and the second battery pack comprises the power-type battery pack.

6. The battery circuit according to claim 1, wherein the control unit comprises a subtracter, a control subunit, a pulse-width modulation (PWM) signal generation subunit, and an inverter, wherein: a first input terminal of the subtracter is configured to receive a current value of the first battery pack; a second input terminal of the subtracter is configured to receive a reference current value; an output terminal of the subtracter is coupled with an input terminal of the control subunit; a first output terminal of the control subunit is coupled with an input terminal of the PWM signal generation subunit; a first output terminal of the PWM signal generation subunit is coupled with the control terminal of the first switch; a second output terminal of the PWM signal generation subunit is coupled with an input terminal of the inverter; and an output terminal of the inverter is coupled with the control terminal of the second switch.

7. The battery circuit according to claim 5, wherein the first battery pack comprises the power-type battery pack; and the second battery pack comprises the energy-type battery pack.

8. The battery circuit according to claim 1, wherein the filtering unit comprises a first inductor and a first capacitor, wherein:

a first terminal of the first inductor is coupled with the positive electrode of the first battery pack; a second terminal of the first inductor is coupled with the power supply terminal;

a first terminal of the first capacitor is coupled with the first terminal of the first inductor; and a second terminal of the first capacitor is coupled with the negative electrode of the first battery pack.

9. The battery circuit according to claim 1, further comprising a first freewheeling unit and a second freewheeling unit, wherein:

an input terminal of the first freewheeling unit is coupled with the second terminal of the first switch; an output terminal of the first freewheeling unit is coupled with the first terminal of the first switch;

an input terminal of the second freewheeling unit is coupled with the second terminal of the second switch; and an output terminal of the second freewheeling unit is coupled with the first terminal of the second switch.

10. The battery circuit according to claim 9, wherein the first freewheeling unit comprises a first diode; and the second freewheeling unit comprises a second diode, wherein:

an anode of the first diode is coupled with the second terminal of the first switch; a cathode of the first diode is coupled with the first terminal of the first switch;

an anode of the second diode is coupled with the second terminal of the second switch; and a cathode of the second diode is coupled with the first terminal of the second switch.

11. The battery circuit according to claim 1, further comprising a voltage stabilization unit, wherein the voltage stabilization unit is coupled between the power supply terminal and the grounding terminal.

12. The battery circuit according to claim 11, wherein the voltage stabilization unit comprises a capacitor.

13. The battery circuit according to claim 1, wherein the voltage transformation unit comprises a inductor.

14. A vehicle, comprising a battery circuit coupled to a motor, wherein the battery circuit comprises:

a power supply terminal, a first battery pack, a second battery pack of a different type from the first battery pack, a voltage transformation unit, a first switch, a second switch, a grounding terminal, a control unit and a filtering unit, wherein:

a positive electrode of the first battery pack is coupled with the power supply terminal; a negative electrode of the first battery pack is coupled with a positive electrode of the second battery pack;

a negative electrode of the second battery pack is coupled with the grounding terminal; a first terminal of the first switch is coupled with the power supply terminal; a second terminal of the first switch is coupled with a first terminal of the second switch; a control terminal of the first switch is coupled with a first output terminal of the control unit;

a second terminal of the second switch is coupled with the grounding terminal; a control terminal of the second switch is coupled with a second output terminal of the control unit; the voltage transformation unit is coupled between the negative electrode of the first battery pack and the second terminal of the first switch;

a first terminal of the filtering unit is coupled with the positive electrode of the first battery pack;

a second terminal of the filtering unit is coupled with the power supply terminal;

a third terminal of the filtering unit is coupled with the negative electrode of the first battery pack; and the control unit is configured to control the first switch and the second switch to be closed or opened according to at least one of a temperature of the first battery pack and a temperature of the second battery pack.

15. The vehicle according to claim 14, wherein the vehicle comprises an electric vehicle and a hybrid vehicle.

16. The vehicle according to claim 14, wherein in a discharging state, the power supply terminal in the battery circuit is configured to be coupled with a power input terminal of the motor, and the grounding terminal in the battery circuit is configured to be coupled with a grounding terminal of the motor.

17. The vehicle according to claim 14, wherein in a charging state, the power supply terminal in the battery circuit is configured to be coupled with a power output terminal of a charging device, and the grounding terminal in the battery circuit is configured to be coupled with a grounding terminal of the charging device.

18. The vehicle according to claim 17, the charging device comprises a charging pile and a braking system of the vehicle.

19. The vehicle according to claim 14, wherein the control unit is further configured to:

control the first switch and the second switch to be closed or opened according to a first preset control rule that causes the first battery pack and the second battery pack to be in a state of charging each other, after a determination that any of an average temperature of the temperatures of the first battery pack and the second battery pack, a highest temperature of the temperatures of the first battery pack and the second battery pack, the temperature of the first battery pack, or the temperature of the second battery pack is less than a preset temperature; and control the first switch and the second switch to be closed or opened according to a second preset control rule that causes the first battery pack and the second battery pack to be in a state other than the state of charging each other, after a determination that any of the average temperature of the temperatures of the first battery pack and the second battery pack, the highest temperature of the temperatures of the first battery pack and the second battery pack, the temperature of the first battery pack, or the temperature of the second battery pack is greater than or equal to the preset temperature.

20. The vehicle according to claim 14, wherein a deviation between a rated voltage of the first battery pack and a rated voltage of the second battery pack is less than a first preset range; and/or a deviation between a ratio of a capacity of the first battery pack to a capacity of the second battery pack and a ratio of a maximum discharge rate of the second battery pack to a maximum discharge rate of the first battery pack is less than a second preset range.

* * * * *